United States Patent
Hsu et al.

(10) Patent No.: US 12,422,303 B2
(45) Date of Patent: Sep. 23, 2025

(54) APPARATUS FOR MEASURING TEMPERATURE

(71) Applicant: T-Global Technology Co., Ltd., Taoyuan (TW)

(72) Inventors: Kuang-Yu Hsu, Taoyuan (TW);
Chiao-Jung Tien, Taoyuan (TW);
Yi-Jing Chu, Taoyuan (TW);
Ming-Huang Lin, Taoyuan (TW);
Ming-Hsien Hsiao, Taoyuan (TW)

( * ) Notice: Subject to any disclaimer, the term of this patent is extended or adjusted under 35 U.S.C. 154(b) by 306 days.

(21) Appl. No.: 18/210,947

(22) Filed: Jun. 16, 2023

(65) Prior Publication Data

US 2024/0418571 A1 Dec. 19, 2024

(51) Int. Cl.
*G01J 5/00* (2022.01)
*G01J 5/02* (2022.01)
*G01J 5/04* (2006.01)

(52) U.S. Cl.
CPC ........... *G01J 5/0014* (2013.01); *G01J 5/0205* (2013.01); *G01J 5/0225* (2013.01); *G01J 5/045* (2013.01)

(58) Field of Classification Search
None
See application file for complete search history.

(56) References Cited

U.S. PATENT DOCUMENTS

| 5,667,300 A * | 9/1997 | Mandelis | G01N 25/18 257/E21.53 |
| 2015/0131700 A1* | 5/2015 | Chrystie | G01J 3/10 374/161 |
| 2015/0201469 A1* | 7/2015 | Shimomura | H05B 6/6411 219/754 |
| 2016/0109393 A1* | 4/2016 | Mandelis | G01N 29/2418 250/341.6 |

* cited by examiner

*Primary Examiner* — Edwin C Gunberg

(57) ABSTRACT

An apparatus for non-contact measuring temperature includes a stand, for securing a vapor chamber, wherein the vapor chamber comprises a condenser area and an evaporator area, wherein the evaporator area comprises a heating spot; a continuous-wave laser device, facing the stand, for irradiating the heating spot by providing an infrared laser beam, wherein the infrared laser beam comprises a first infrared wavelength range; a switch device, controlling an irradiating cycle of the infrared laser beam, wherein the irradiating cycle comprises a irradiating time-interval and a non-irradiating time-interval; a first infrared sensor, facing the stand, for collecting a first thermal radiation data of the heating spot in a second infrared wavelength range; a data processing unit, only transferring the first thermal radiation data in the non-irradiating time-interval into a first temperature, wherein the irradiating time-interval is longer than the non-irradiating time-interval.

6 Claims, 2 Drawing Sheets

APPARATUS FOR MEASURING TEMPERATURE

BACKGROUND OF THE INVENTION

1. Field of the Invention

The present invention relates to an apparatus for measuring temperature, particularly to an apparatus for non-contact measuring temperature.

2. Description of the Prior Art

To measure the temperatures of the condenser area and evaporator area of an ultra-thin vapor chamber by the conventional contact-type measurement instrument, the ultra-thin vapor chamber may be damaged due to the excessive contact pressure. It is necessary to provide a new apparatus for measuring temperature to avoid the problem.

SUMMARY OF THE INVENTION

The purpose of the invention is to provide an apparatus for non-contact measuring temperature, comprising:
- a stand, for securing a vapor chamber, wherein the vapor chamber comprises a condenser area and an evaporator area, wherein the evaporator area comprises a heating spot;
- a continuous-wave laser device, facing the stand, for irradiating the heating spot by providing an infrared laser beam, wherein the infrared laser beam comprises a first infrared wavelength range;
- a switch device, controlling an irradiating cycle of the infrared laser beam, wherein the irradiating cycle comprises an irradiating time-interval and a non-irradiating time-interval;
- a first infrared sensor, facing the stand, for collecting a first thermal radiation data of the heating spot in a second infrared wavelength range;
- a data processing unit, only transferring the first thermal radiation data in the non-irradiating time-interval into a first temperature, wherein the irradiating time-interval is longer than the non-irradiating time-interval.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

Figure 1:
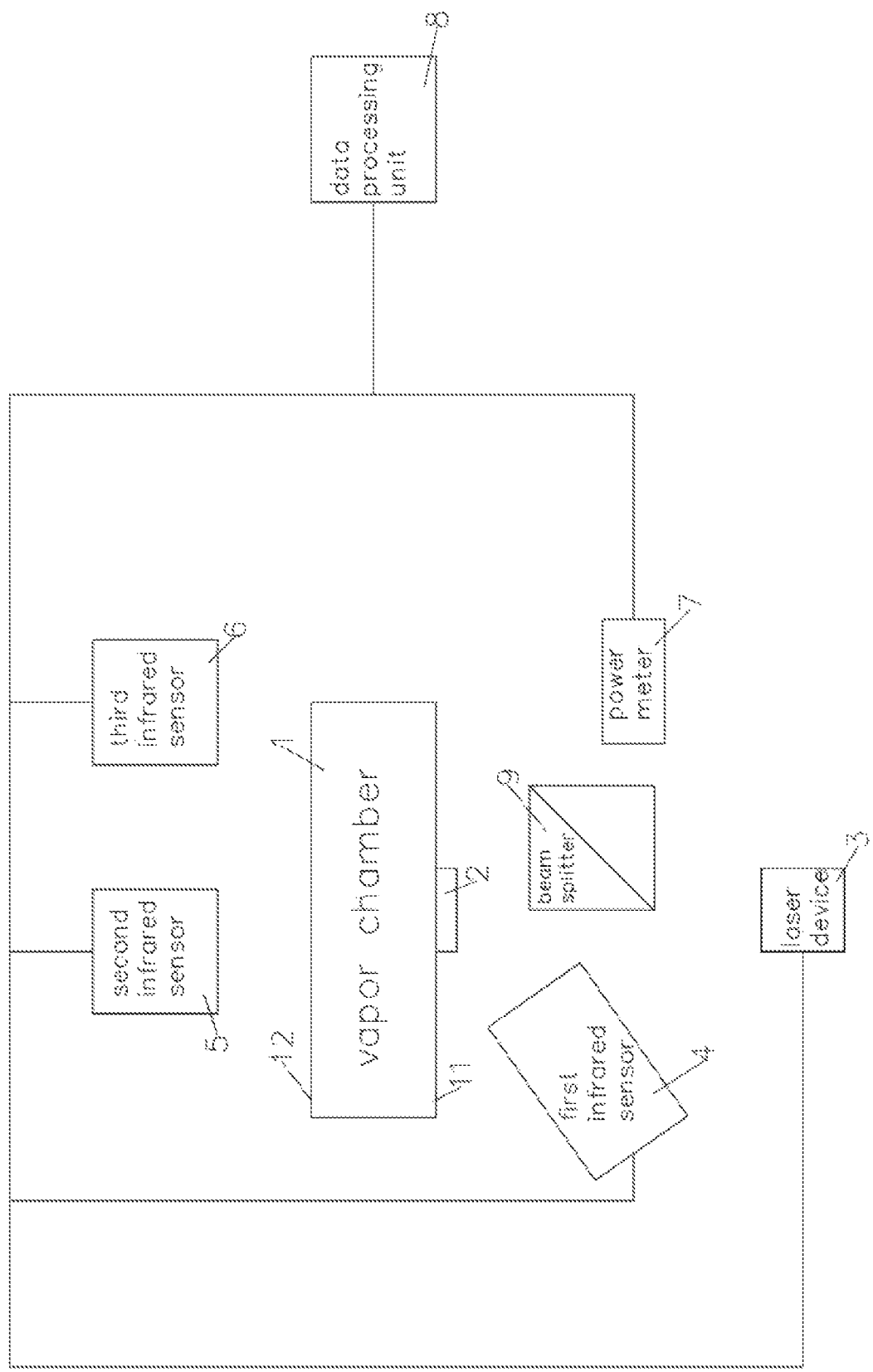
FIG. 1 illustrates an apparatus for non-contact measuring temperature according to an embodiment of the invention.

Referring to FIG. 1, an embodiment of the invention, an apparatus for measuring temperature is provided. An ultra-thin vapor chamber 1, disposed in a stand, comprises an evaporator area 11 and a condenser area 12. There is a light-absorption layer 2 on the heating spot of the evaporator area 11. The light-absorption layer 2 may be a layer of black paint with an absorbance over 99% to absorb the infrared light for heating the heating spot. The continuous-wave laser device 3, comprising the wavelength range of the infrared, faces the stand. In an embodiment, the continuous-wave infrared laser beam with a peak value of wavelength 808 nm is irradiated toward the light-absorption layer 2 on the heating spot. There is a beam splitter 9 between the continuous-wave laser device 3 and the light-absorption layer 2. In an embodiment, 95% of the continuous-wave laser beam is transmitted to the light-absorption layer 2 for heating the heating spot of the evaporator area 11. The rest of the 5% continuous-wave laser beam is reflected to the power meter 7. By measuring the power of the reflected continuous-wave laser beam, the heating power to the heating spot, provided by the continuous-wave laser beam, can be estimated through the data processing unit 8. The data processing unit 8 may be a personal computer or a workstation.

In an embodiment, the first infrared sensor 4 faces the stand, and there is an optical filter in front of the first infrared sensor 4, such as the band-stop filer for blocking the 808 nm infrared. Within the rejection band, the optical density of the band-stop filer may be greater than 6, and the full-width half-maximum is about 30 nm. It is optional to use the long-wavelength-pass filter with the wider rejection bandwidth. The rejection bandwidth of the long-wavelength-pass filter may comprises 700-1400 nm infrared light, with the optical density greater than 5, capable of passing the long wavelength infrared light. The first infrared sensor 4 may detect the infrared light in the wavelength range with a peak value 2.3 um for collecting the thermal radiation data of the heating spot. Then the data processing unit 8 transfers the thermal radiation data into the temperature. The second infrared sensor 5 is for collecting the thermal radiation data of the first reference spot on the condenser area 12. The first reference spot faces toward the heating spot. The third infrared sensor 6 is for collecting the thermal radiation data of the second reference spot on the condenser area 12. The data processing unit 8 transfers the corresponding thermal radiation data into the temperatures of the of the first and second reference spot. In an embodiment, the distance between the first and second reference spot is 3 cm.

In an embodiment, there is no optical filter in front of the first infrared sensor 4. The first infrared sensor detects the infrared light in the wavelength range between 8 um and 14 um.

Figure 2:
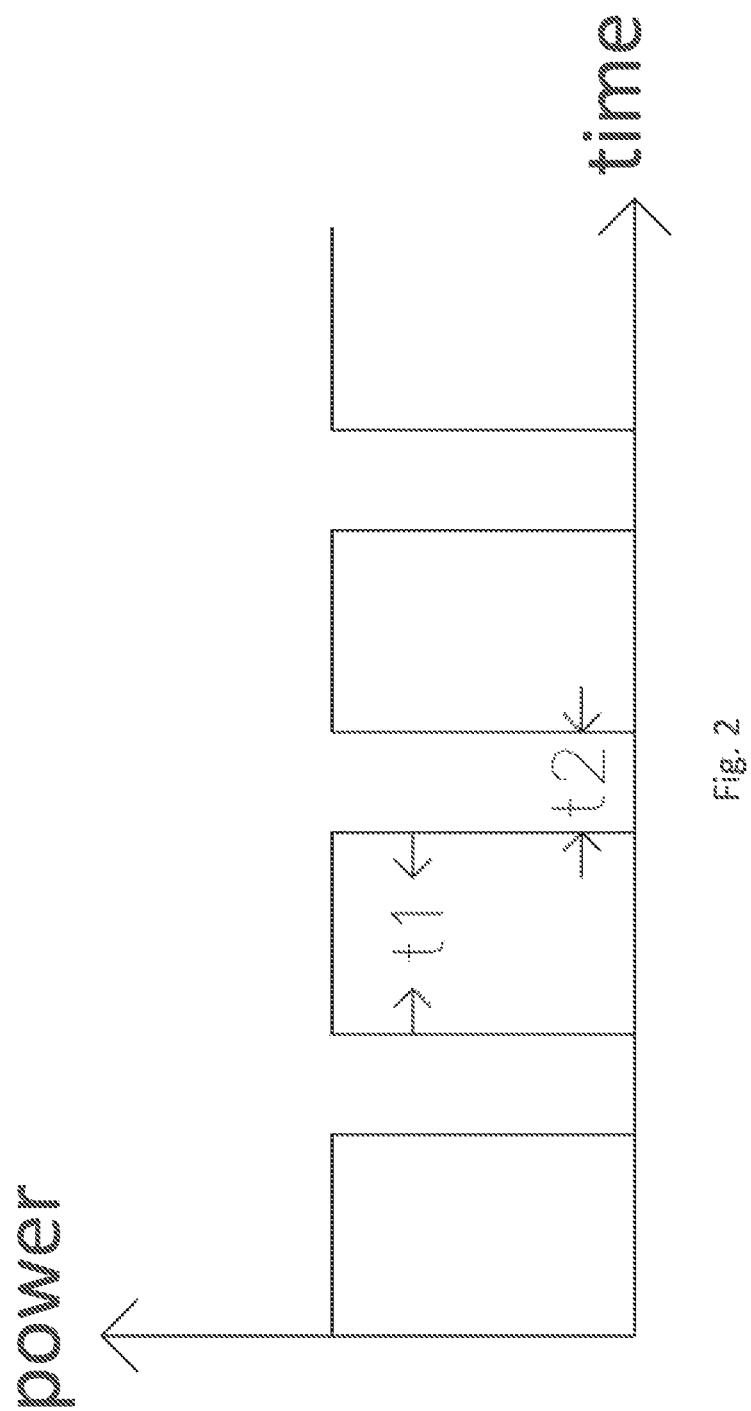
FIG. 2 illustrates a relational graph of the irradiation power on the heating spot v. time, irradiated by the continuous-wave laser device, according to an embodiment of the invention.

In an embodiment, referring to FIG. 2, a relational graph of the irradiation power vs. time is illustrated. The switch device controls the continuous-wave laser beam of the continuous-wave laser device 3 to intermittently irradiate the light-absorption layer 2 on the heating spot in a fixed cycle. An irradiating cycle comprises the irradiating time-interval t1 to irradiate the heating spot and the non-irradiating time-interval t2 without irradiating the heating spot. The irradiating time-interval t1 is longer than the non-irradiating time-interval t2. In an embodiment, 80% of the irradiating cycle is the irradiating time-interval t1, and 20% of the irradiating cycle is the non-irradiating time-interval t2. In an embodiment, the data processing unit 8 only transfers the first thermal radiation data after a delay time, starting from a beginning of the non-irradiating time-interval, into the first temperature. The delay time, in an embodiment, may be 20 ms (mini-second), 40 ms, or 60 ms.

In an embodiment, the switch device is an optical shutter, disposed in front of the continuous-wave laser device 3 to control the irradiating cycle of the continuous-wave laser bean on the heating spot by controlling the optical shutter open or close through the driving circuit of the optical shutter. In an embodiment, the switch device is a switch circuit, controlling the irradiating cycle of the continuous-wave laser bean on the heating spot by turning the continuous-wave laser device 3 on and off.

In an embodiment, the data processing unit 8 only transfers the thermal radiation data collected in the non-irradiating time-interval t2. In an embodiment, the data processing unit 8 does not process the thermal radiation data collected in the irradiating time-interval t1.

In an embodiment, the data processing unit 8 receives and processes the data coming from the power meter 7, the third infrared sensor 6 first infrared sensor 4, the second infrared sensor 5, to obtain the heating power on the heating spot, the temperature of the heating spot, the temperature of the first reference spot, and the temperature of the second reference spot.

What is claimed is:

1. An apparatus for measuring temperature, comprising:
   a stand, for securing a vapor chamber, wherein the vapor chamber comprises a condenser area and an evaporator area, wherein the evaporator area comprises a heating spot;
   a continuous-wave laser device, facing the stand, for irradiating the heating spot by providing an infrared laser beam, wherein the infrared laser beam comprises a first infrared wavelength range;
   a switch device, controlling an irradiating cycle of the infrared laser beam, wherein the irradiating cycle comprises a irradiating time-interval and a non-irradiating time-interval;
   a first infrared sensor, facing the stand, for collecting a first thermal radiation data of the heating spot in a second infrared wavelength range;
   a data processing unit, only transferring the first thermal radiation data in the non-irradiating time-interval into a first temperature, wherein the irradiating time-interval is longer than the non-irradiating time-interval.

2. The apparatus for measuring temperature as in claim 1, wherein the data processing unit only transfers the first thermal radiation data after a delay time, starting from a beginning of the non-irradiating time-interval, into the first temperature.

3. The apparatus for measuring temperature as in claim 1, wherein the switch device comprises an optical shutter and a driving circuit of the optical shutter.

4. The apparatus for measuring temperature as in claim 1, wherein the switch device comprises a switch circuit for directly turning on and off the continuous-wave laser device.

5. The apparatus for measuring temperature as in claim 1, further comprising a second infrared sensor and a third infrared sensor for collecting a second thermal radiation data of a first reference spot and a third thermal radiation data of a second reference spot in the condenser area respectively.

6. The apparatus for measuring temperature as in claim 1, wherein the data processing unit transfers the second thermal radiation data and the third thermal radiation data into a second temperature and a third temperature respectively.

\* \* \* \* \*